L. H. HOMRIGHAUSEN.
VEHICLE WHEEL TREAD.
APPLICATION FILED JULY 30, 1913.
1,155,925.
Patented Oct. 5, 1915.
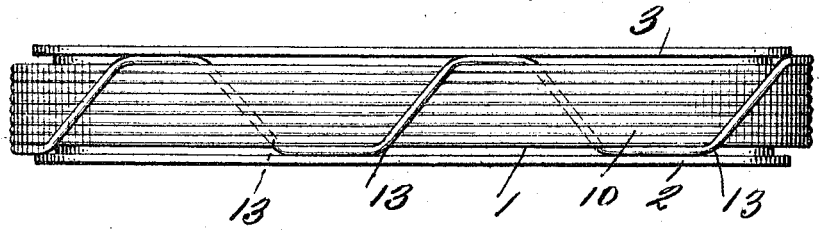
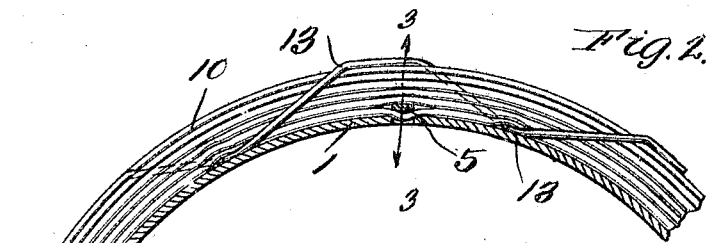
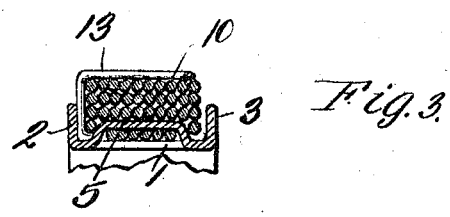
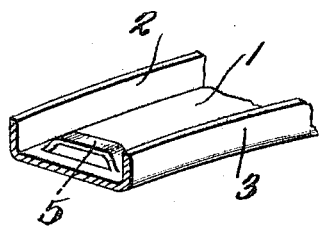
Witnesses
Inventor

UNITED STATES PATENT OFFICE.

LOUIS HENRY HOMRIGHAUSEN, OF OSAWATOMIE, KANSAS.

VEHICLE WHEEL-TREAD.

1,155,925.	Specification of Letters Patent.	Patented Oct. 5, 1915.

Application filed July 30, 1913. Serial No. 782,057.

*To all whom it may concern:*

Be it known that I, LOUIS HENRY HOM-RIGHAUSEN, a citizen of the United States, residing at Osawatomie, in the county of Miami and State of Kansas, have invented certain new and useful Improvements in Vehicle Wheel-Treads, of which the following is a specification.

This invention relates to vehicle wheels and more particularly to an improved tire or tread of the same and the primary object of the invention is the provision of a tire tread which is constructed of a single strand of wire wound about the periphery of the felly of the wheel and securely connected thereto, providing a tire embodying resiliency practically equal to the resiliency of the ordinary solid rubber tire and which will not be susceptible to cuts and wear occasioned by rough travel.

With the foregoing and other objects in view this invention relates to such details of construction, combination and arrangement of parts as will be hereinafter more fully described, illustrated in the accompanying drawings and claimed.

In describing my invention in detail reference will be had to the accompanying drawings wherein like characters designate like or corresponding parts throughout the several views and in which:

Figure 1 is a plan view of a wheel showing the improved tread mounted thereupon. Fig. 2 is a central sectional view through a portion of a wheel rim. Fig. 3 is a cross sectional view on the line 3—3 of Fig. 2, and Fig. 4 is a detail perspective view of the portion of the metallic band which is mounted upon the periphery of the felly of the wheel.

Referring more particularly to the drawings, 1 designates a metallic band which is mounted upon the outer periphery of the felly (not shown) of a vehicle wheel (not shown). The metallic band 1 has its sides 2 and 3 bent upwardly and at right angles to the main body portion of the band and forming flanges for preventing the lateral slipping of the tread or tire. The band 1 is provided with straps 5, which are formed by the cutting of slits in the band at various intervals about the same and bending the portions between the slits upwardly. The straps 5 are bent upwardly from the inner surface of the body portion of the band 1 as is clearly shown in Figs. 3 and 4 of the drawings.

A strand of wire 10 has one end thereof inserted beneath one of the straps 5 and held in place by a plate 11 and a knot 12, which knot is formed upon the end of the wire. The wire 10 is wound about the periphery of the band 1, being inserted beneath the various straps 5 a number of times and after it has been wound a desired number of times about the band 1 so as to form a tire or tread for the vehicle wheel (not shown) upon which the band 1 is mounted, it is wrapped diagonally about the various windings of itself as is shown at 13 in the drawings.

By diagonally winding the wire about the strands of itself a compact tire tread is formed and one which will prevent the various windings of the wire from becoming loosened or separated one from the other thereby providing a firm and compact tire tread which will withstand rough usage in travel. However, because of the abutting relation of one layer of the wire forming the tread with that of the adjacent layer as well as the abutting relation between the strands with the adjacent strands together with the peculiar manner of diagonally winding the wire thereabout it is to be understood that when a heavy weight is disposed on the tire slight lateral motion is naturally imparted to the layers which consequently imparts a slight yielding motion to the strands, the aforesaid motion being allowed by the diagonal winding of the wire which alternately engages the sides of the tire. The diagonal winding of the wire 10 about the windings of itself also forms means for preventing the slipping or skidding of the vehicle wheels (not shown) upon which the band 1 may be mounted.

The tread formed of the various windings of the wire is securely held attached to the band 1 by the insertion of the wire beneath the various straps 5 formed upon the band 1.

In practical fields certain minor features of construction, combination and arrangement of parts may necessitate alterations to which the patentee is entitled provided such alterations are comprehended within the scope of what is claimed.

What is claimed is:—

1. A vehicle wheel tread including a metallic band, a strand of wire wound a number of times about the periphery of the band, the outer end of the wire being wrapped diagonally about the portion of the wire that has been wound about the band, said wire being arranged to permit of a slight yielding movement, and the diagonal winding of said wire constituting an anti-skidding means for the tread.

2. A vehicle wheel tread including a metallic band, flanges formed by bending the sides of the band upwardly, a plurality of straps formed upon said band by slitting said band at spaced intervals and bending the portions between the slits upwardly, a plate disposed beneath one of the slits formed by the straps, a strand of wire inserted beneath one of the straps and through said plate, a knot formed upon one end of the wire and bearing against the plate for anchoring the wire on the plate, said wire being inserted beneath said straps and being supported by said flanges, said wire being further wound a number of times about the band and extending beyond the periphery of the flanges, the outer end of the wire being wound diagonally about the portion of the wire that has been wound on the band, said wire being arranged to permit a yielding movement upon the disposition of a heavy load, and the diagonal winding of the wire constituting an anti-skidding means for the tread.

In testimony whereof I affix my signature in presence of two witnesses.

LOUIS HENRY HOMRIGHAUSEN.

Witnesses:
 WALTER BARNES,
 W. L. DUNAWAY.